Patented June 18, 1935

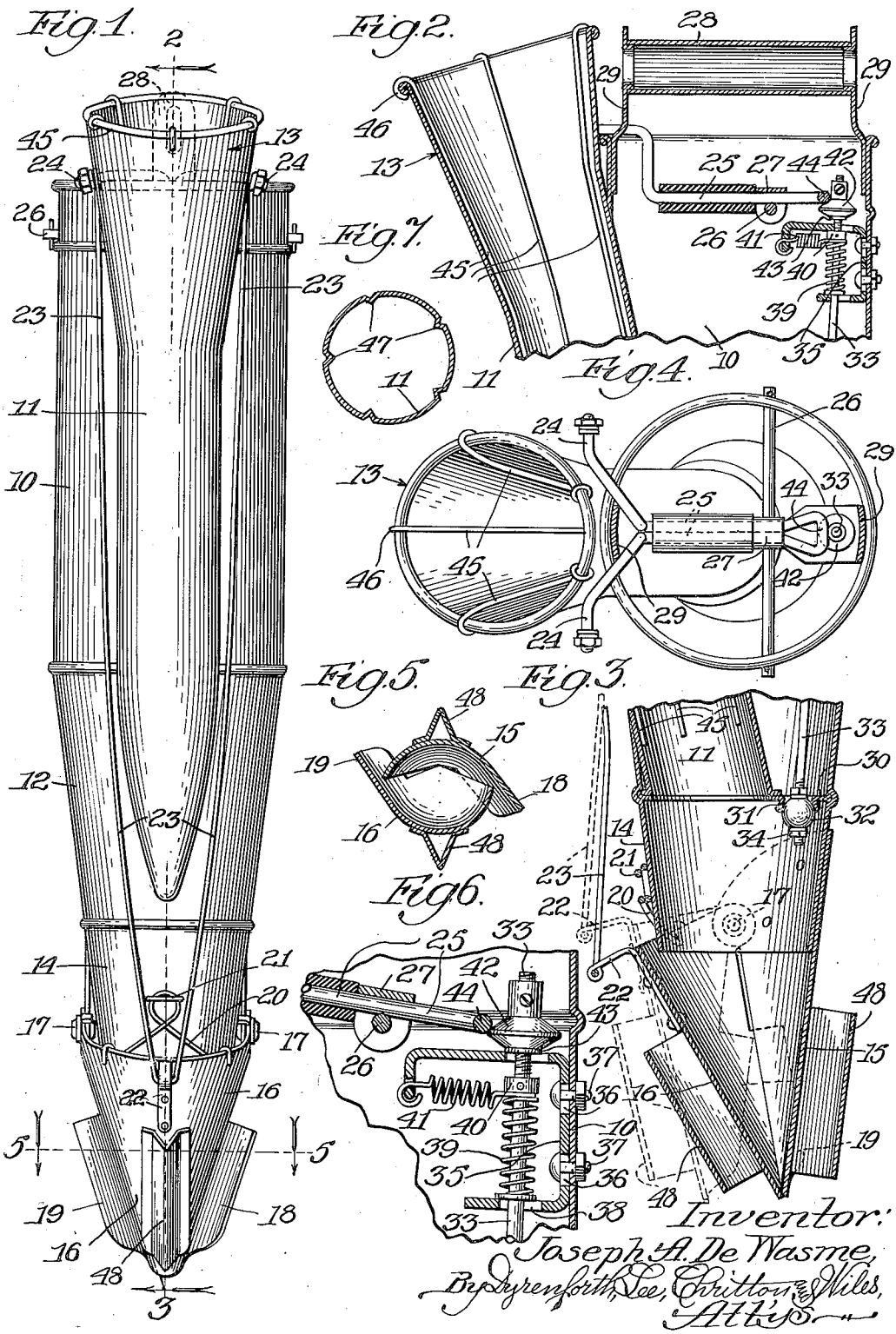

2,005,518

UNITED STATES PATENT OFFICE 2,005,518

PLANTING IMPLEMENT

Joseph A. De Wasme, Chicago, Ill.

Application May 19, 1934, Serial No. 726,559

7 Claims. (Cl. 111—4)

This invention relates to improvements in planting implements such as are used to lighten the labor of planting tobacco plants and other plants such as cabbages, tomatoes, strawberries and the like.

The general object of the invention is to provide an implement of this character which may be operated with ease and efficiency.

Contributory objects are to provide improved valve mechanism for releasing a limited amount of water from the reservoir during each operation; to provide improved jaws or spades at the lower end to facilitate the preparation of the hole into which the plant is dropped; to provide an improved chute through which the plant slides without sticking and to provide other improved parts which may be readily manufactured and assembled.

In the accompanying drawing I have illustrated one embodiment of my invention.

Fig. 1 is a front elevation thereof;

Fig. 2 is an enlarged sectional elevation of the upper part of the implement;

Fig. 3 is an enlarged sectional elevation of the lower part of the implement;

Fig. 4 is a top plan view of the implement;

Fig. 5 is a section on the line 5—5 of Fig. 1;

Fig. 6 is a fragmentary view of certain parts in a different position from that in Fig. 2; and Fig. 7 is a sectional view of a modified discharge tube.

The implement, in the form shown in the drawing, consists essentially of a sheet metal housing or water reservoir 10, of substantially cylindrical outline, and a chute or discharge tube 11 for the plants, inclined with respect thereto and merging therewith at the lower, tapering section 12. The plants are dropped in the flaring upper end 13, of the tube, and slide down the same into the lowermost chamber 14, from which their discharge is normally blocked by the relatively movable jaws or spades 15, 16, as shown in Fig. 3. When the jaws are open the plants drop into the opening in the soil provided for them, in a manner which is well understood.

The jaw 15 is fixed, being riveted to the lower conical section 14 of the housing and the other jaw 16 is pivoted at 17 to the first jaw. When swung open it assumes the dotted line position shown in Fig. 3. As shown in Figs. 1 and 5, the fixed jaw 15 is provided with a wing or cutting edge 18 and the movable jaw 16 is provided with a similar wing 19, whereby when the housing is rotated about a vertical axis these wings or cutting edges facilitate the drilling of a tapering hole in the soil and of a size somewhat greater than the tapering jaws themselves, whereby said jaws may be more readily separated to permit the plant to drop into the opening.

The movable jaw 16 is normally held in closed position by the spring 20, which is formed, as shown in Fig. 1, with a central loop retained under a staple 21 mounted on the wall of the housing. The hinged jaw 16 has a hook 22 mounted thereon through an eyelet in the end of which the wire 23 passes, said wire being bent on itself to form a double operating rod for spreading the jaws when said rod is pulled upwardly. The upper ends of said rod engage extensions 24 on a lever 25, which consists preferably of a wire or rod, bent to provide two parallel spans, side by side, and surrounded by a rubber hand grip, which lever is pivoted about a transverse rod 26 by means of a formed piece of sheet metal 27, as shown in Figs. 2 and 4. A handle 28 or hand grip is mounted at the top of the housing 10 on uprights 29 and is at a convenient distance from the lever 25 so that the operator may grip not only the fixed handle 28 but may grip the movable lever 25 also and raise one end of the same, to rock it about its pivot and force open the hinged jaw 16 after the lower end of the implement has been pushed down into the soil. The handle 28 also enables the operator to twist the implement back and forth or rotate it while pressing it downwardly to dig the necessary opening for the plant, and to turn it to close in the earth around the plant.

As stated, the upper part of the main housing comprises a reservoir for water or other liquid, the bottom of the tank 30, (see Fig. 3) having a flaring outlet 31 or valve seat, closed by a ball valve member 32, the ball being mounted on the screw threaded end of the valve stem 33 and adjustably retained by nuts 34. The ball may be made of suitable compressible material such as rubber and is normally pressed upwardly to close the outlet, the valve being opened by moving the stem downwardly by means which will now be described.

The upper end of the valve stem, as shown in Fig. 2, passes through openings in a U shaped bracket 35 having vertical slots 36 therein through which bolts 37 pass for adjustably clamping it to the side wall of the reservoir 10. The openings through which the valve stem passes are in the form of slots 38 so that the valve stem is not only guided in its vertical movement but may move laterally as well, as shown by another of its positions in Fig. 6. A spring 39, mounted in the bracket, presses upwardly on the collar 40 mounted on said valve stem thus holding the latter normally in uppermost position and retaining the valve at the lower end in closed position. Another spring 41, hooked to one of the arms of the bracket 35, holds the valve stem in the left hand position as viewed in Fig. 2, as distinguished from its right hand position, as viewed in Fig. 6. Near the top of the valve stem is mounted a double cam or collar 42 having double beveled surfaces, and a depending shoulder 43 to engage the arm of the bracket beneath it and limit the downward movement of the valve stem. The rear end of the lever 25, which, as stated, is composed of a wire or rod, is bent in the form of a loop, the transverse rear span 44 of which engages the upper of the two cam surfaces as shown in Fig. 2.

When the operator grips the handle and pulls the front of the lever 25 upwardly the rear portion presses the valve rod downwardly, thereby opening the valve to discharge a limited amount of water through the jaws and into the opening in the soil into which the plant is being dropped concurrently. The slope of the cam is such that the valve stem does not swing rearwardly against the pull of the spring 41 until the shoulder 43 strikes the upper arm of the bracket 35, at which time the cam is forced to the right as shown in Fig. 6, further movement resulting in the cam surface snapping over the rounded rear end of the lever 44 and snapping upwardly to close the valve immediately, even though the operator continues to hold the jaws open for a longer period. When the operator withdraws the implement from the ground and releases his grip on the lever 25, the jaws are closed and the lever is restored to initial position by the spring 20, causing the rear end 44 of said lever to snap over the double cam 42. Said double cam constitutes a yielding retainer cooperating with the part 44 to open said valve temporarily and permit it to snap shut without preventing the further rocking movement of the lever 25, which is necessary to fully open the jaws at the bottom of the implement. By virtue of the downwardly flaring valve seat 31, there is less danger of the valve fouling by reason of leaves or other foreign matter in the water tank. To clean the valve seat it is merely necessary to grip the handle and operate the lever 25, thereby discharging a small quantity of water through the outlet to wash off foreign material if any should be caught between the valve and its seat.

To facilitate the descent of the plant through the inclined tube 11, it may be provided on the inside with a series of ribs in the form of wires 45, with hooks 46 formed at the top to grip the flaring inlet end. Said ribs may be otherwise formed, as for example by pressing in the metal of the discharge tube 11, as shown in Fig. 7, at 47. Also, to facilitate the opening of the jaws, each may be provided with a V shaped sheet metal projection 48, welded thereto, to force the earth aside.

I claim:

1. In a planting implement, a tank for liquid, a valve therein, a longitudinally movable rod to open said valve, a manually movable lever, a beveled member on said rod yieldingly engaged by said lever whereby, when said lever is actuated, said rod is moved to open said valve, a fixed stop to be engaged by said beveled member to obstruct the same and prevent further valve opening movement of said rod, whereby additional movement of said lever causes it to slip off said beveled member, thereby causing said valve to deliver a limited amount of liquid.

2. In a planting implement, a water tank, a valve in the bottom thereof, a vertical valve stem therefor extending up through said tank, a movable release member, a beveled collar on the upper end of said valve stem engaged by said release member to depress said valve stem until said release member slips off said collar and means normally holding said valve stem in uppermost position.

3. In combination a water tank, an outlet valve having a seat flaring downwardly, a vertical valve closure rod, a valve on the same fitting said seat, a spring normally pressing said valve upwardly against its seat, manually actuated means to press said rod downwardly, a bracket through which said rod passes having openings permitting vertical and lateral movement of said rod, and means causing lateral movement thereof after a predetermined downward movement to disengage said rod from said manually actuated means and thus limit the opening of said valve.

4. In combination a water tank, an outlet valve having a seat flaring downwardly, a vertical valve closure rod, a valve on the same fitting said seat, a spring normally pressing said valve upwardly against its seat, manually actuated means to press said rod downwardly, a bracket through which said rod passes having openings permitting vertical and lateral movement of said rod, means causing lateral movement thereof after a predetermined downward movement to disengage said rod from said manually actuated means and thus limit the opening of said valve and means for adjusting said bracket to vary the extent of said valve opening.

5. In combination, a water tank, a double arm bracket having a slot therein, a bolt passing through the tank wall and said slot and adjustably securing said bracket thereto, a vertical valve rod passing through the arms of said bracket, a valve on said rod controlling an opening in the bottom of said tank, a double cam on the top of said rod and a pivoted lever to engage the top of said cam and snap under the same after a predetermined movement.

6. In a device of the class described, a water reservoir having a transverse rod near the top, a lever pivoted on said rod between its ends, the forward end being accessible for manual lifting, a cam engaged by the rear end of said lever, a valve stem on which said cam is mounted, a valve in the bottom of said tank controlled by said valve stem, a spring normally impelling said valve stem upwardly and a second spring normally impelling the upper end of said valve stem forwardly to maintain the engagement between said rear end and said cam.

7. A planting implement comprising a reservoir, a housing beneath the same, a handle at the top thereof, a plant chute communicating with said housing, a fixed jaw secured to said housing, a movable jaw pivoted to said fixed jaw, a lever adjacent said handle, a link connecting said lever to said movable jaw to operate the latter, a valve in the lower end of said reservoir having a flaring seat projecting downwardly, a valve member closing said seat and a cam operatively connected with said member and yieldingly engaged by said lever, during its initial movement, for opening said valve momentarily by a downward movement thereof, said lever slipping over said cam during the completion of its jaw actuating movement.

JOSEPH A. DE WASME.